United States Patent [19]
Mikame

[11] Patent Number: 6,144,920
[45] Date of Patent: Nov. 7, 2000

[54] MAP DISPLAYING APPARATUS

[75] Inventor: Masami Mikame, Okazaki, Japan

[73] Assignee: Denso Corporation, Kariya, Japan

[21] Appl. No.: 09/143,516

[22] Filed: Aug. 28, 1998

[30] Foreign Application Priority Data

Aug. 29, 1997 [JP] Japan .................................. 9-235160
Feb. 25, 1998 [JP] Japan ................................ 10-043711

[51] Int. Cl.[7] .............................. G01C 21/00; G06G 7/78
[52] U.S. Cl. ........................ 701/212; 701/208; 701/211; 701/209; 340/988; 340/990; 340/995; 345/353; 345/357
[58] Field of Search .................................. 701/200, 208, 701/209, 210, 211, 212; 340/988, 990, 995; 345/428, 439, 353, 357, 333, 352

[56] References Cited

U.S. PATENT DOCUMENTS

| | | | |
|---|---|---|---|
| 5,784,059 | 7/1998 | Morimoto et al. | 701/209 |
| 5,825,306 | 10/1998 | Hiyokawa et al. | 701/209 |
| 5,884,218 | 3/1999 | Nimura et al. | 701/208 |
| 5,908,465 | 6/1999 | Ito et al. | 701/211 |

FOREIGN PATENT DOCUMENTS

| | | |
|---|---|---|
| 720003A1 | 7/1996 | European Pat. Off. |
| 7-29410 | 6/1995 | Japan . |
| 9-292262 | 11/1997 | Japan . |

Primary Examiner—Jacques H. Louis-Jacques
Attorney, Agent, or Firm—Pillsbury Madison & Sutro LLP

[57] ABSTRACT

A map displaying apparatus comprises a displaying device for displaying a map, a map storing device for storing data of multiple maps showing predetermined areas with different scales, a facility storing device for storing data of facilities located in respective positions on the maps, a facility category selecting device for selecting a category of facility to be displayed on the displaying device, and a display controlling device for displaying one of the maps having different scales on the displaying device and for displaying facilities selected in their respective positions on the displayed map. The map displaying apparatus also includes a map scale controlling device for changing the scale of the map displayed on the displaying device so that the number of facilities displayed on the map is kept below a predetermined upper limit.

13 Claims, 12 Drawing Sheets

FIG. 10A  L1  DETAILED MAP LEVEL PACKET — PRESENT POSITION

FIG. 11A  DETAILED MAP LEVEL PACKET
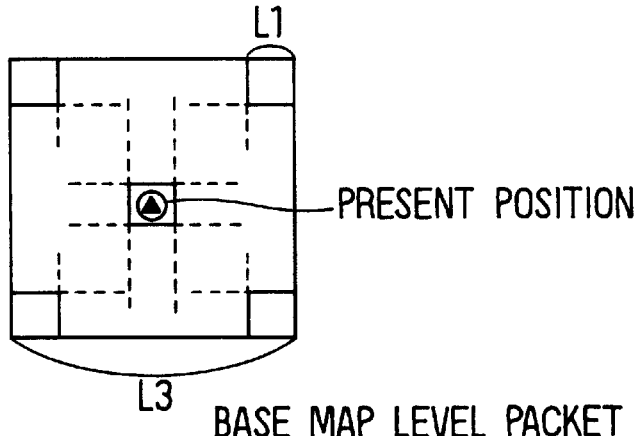
FIG. 11B  BASE MAP LEVEL PACKET
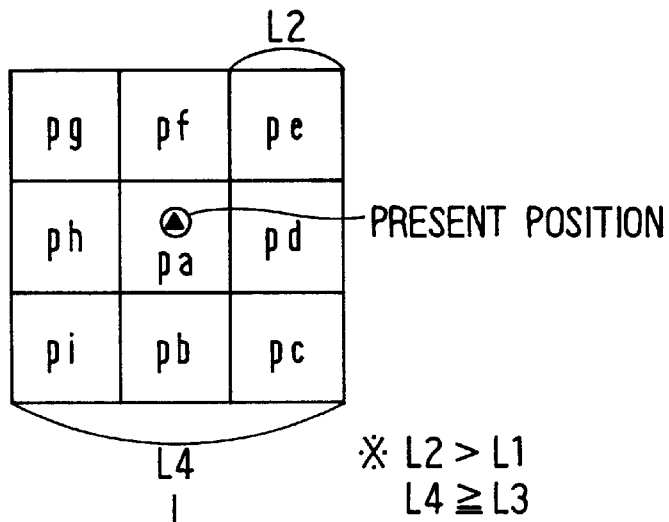
※ L2 > L1
   L4 ≧ L3
FIG. 11C
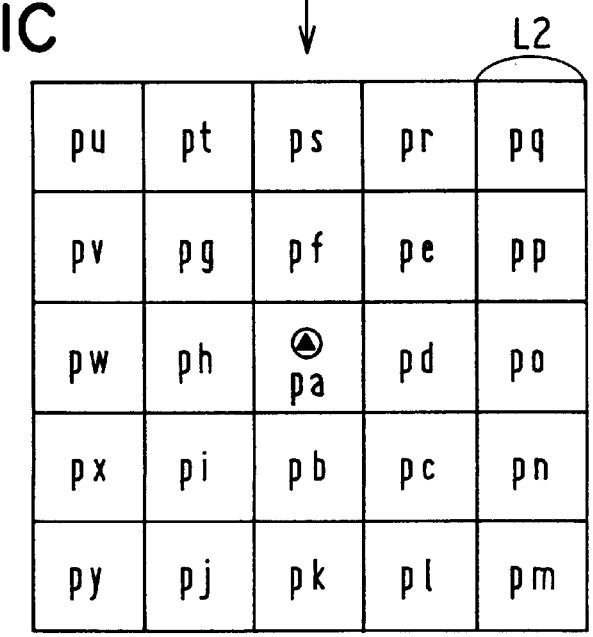

MAP DISPLAYING APPARATUS

CROSS REFERENCE TO RELATED APPLICATION

This application is based upon and claims the benefit of priority of Japanese Patent Applications No. H.9-235160 filed on Aug. 29, 1997 and No. H. 10-43711 filed on Feb. 25, 1998, the contents of which are incorporated herein by reference.

BACKGROUND OF THE INVENTION

1. Field of the Invention

This invention relates to a map displaying apparatus, and particularly to a map displaying apparatus which can display a map on a screen with facilities superimposed on the map.

2. Description of the Related Art

A car navigation system is installed in a car and detects the position of the car as the car travels by means of GPS or the like and displays that position on a display together with a road map to help the driver of the car reach a destination smoothly. Navigation systems which not only show the present position of the car but also display marks representing certain facilities such as, for example, gas stations and restaurants are also known, and these are effective when a driver wants to go to one of these facilities. Specifically, when a driver selects a category of facility to be displayed, for each facility of that category located in the region covered by the map on which the present position of the car is being displayed, the navigation system displays a facility mark M denoting that facility in the appropriate position on the map.

In the display example shown in FIG. 4A, there are only a few facility marks M. Therefore, it is possible to distinguish easily with roads as references the positions in which the facilities are located. However, such facilities are not distributed evenly in all areas, and the density in which facilities exist is different in different areas; for example, facilities of the same category may exist in concentration in urban areas while being only found here and there in country areas. Consequently, for example in the display example shown in FIG. 4B, although the scale of the map is the same as that of FIG. 4A, because there is a high concentration of facilities of the selected category, there are many facility marks in the map region being displayed and the roads themselves are hidden. When the roads are hidden, it is impossible for the route to a chosen facility to be distinguished, and the benefit of the facility guidance is lost. When, on the other hand, facilities of the selected category are few and far between, it may happen that no facility mark is displayed in the map region being displayed. In this case also the benefit of the facility guidance is lost.

Therefore, when as in the display example shown in FIG. 4B there are too many facility marks, it is necessary for the scale of the displayed map to be increased to obtain a suitable density of facility marks, for example as shown in FIG. 4C. (The scale of the displayed map shown in FIG. 4C is four times the scale of the displayed map shown in FIG. 4B.) When, on the other hand, no facility marks whatsoever are displayed in the map region being displayed, reversely it is necessary for the scale of the displayed map to be reduced until there is at least one facility mark in the map region being displayed. The user himself or herself has had to understand these facility mark display states and perform an operation to change the scale to one which the user finds easy to read, and this has been extremely troublesome.

Also, in a navigation system, when a user is specifying a facility, there are times when although the user knows the category of the facility (for example Airport, Bank, Gas Station or Park) and perhaps even the individual name of the facility (for example XX Airport, XY Branch of XZ Bank, YX Gas Station or YY Park or the like), because the user is unfamiliar with the geography of the vicinity in which the facility is located, he or she is unable to locate the position of the facility on a map. To make it possible for a user to specify a facility even in this kind of case, data search systems capable of searching for data indicating the position of a facility on the map from the category and/or the individual name of the facility are in use.

However, when a user specifies the category of a facility, the data search system finds all facilities of that category that have been preregistered in the system. Here, when many facilities of the same category have been preregistered, if all the facilities found are displayed randomly on the display, the user looking at that display may be at a loss to decide which facility to choose.

To avoid this, some data search systems in the related art have a function of, when many facilities of the same category have been preregistered, rearranging the many facilities found in the order of their proximity to the present position and displaying these rearranged facilities on the display in the form of a list. With this function, because facilities close to the present position can be ascertained just by looking at the display, it is easy for the user to choose a facility. The processing of rearranging the facilities found in a search in the order of their proximity to the present position is carried out by a microcomputer.

However, when many facilities found in a search are being rearranged in the order of their proximity to a present position, the more facilities there are the longer the processing time required for their rearrangement becomes. When an ordinary sorting algorithm is used, the processing time required for the rearrangement increases exponentially with respect to the number of facilities (the amount of data) found in the search.

As the waiting time from when a user specifies a category of facility to when facilities of that category found in a search are displayed on a display, normally, although there are differences among individuals, the limit that a user will tolerate is said to be about two to three seconds. However, when many facilities are found in the search, it takes a great deal of time from the user specifying the facility category to the facilities of that category found in the search being displayed on the display, and there is a risk of this time exceeding the limit that the user will tolerate.

SUMMARY OF THE INVENTION

It is therefore a first object of the invention to provide a map displaying apparatus capable of automatically changing the scale of a displayed map to a scale such that it is easy for a user to see facilities displayed on the map. Also, it is a second object of the invention to provide a searching system capable of carrying out a search of facilities relatively quickly even when there are many facilities matching the search criteria.

To achieve the above-mentioned first object and other objects, the invention provides a map displaying apparatus comprising a displaying device for displaying a map, a map storing device for storing multiple maps showing predetermined areas with different scales, a facility storing device for storing facilities located in respective positions on the maps, a facility category selecting device for selecting a category of facility to be displayed on the displaying device, and a display controlling device for displaying one of the maps having different scales stored in the map storing device on the displaying device and displaying facilities selected using the facility category selecting device in their respective positions on the displayed map. The map displaying apparatus also comprises a map scale controlling device for changing the scale of the map displayed on the displaying device, as necessary, so by the display controlling device that the number of facilities displayed on the map by the display controlling device is kept below a predetermined upper limit.

In this map displaying apparatus, multiple maps showing predetermined areas with different scales are stored in the map storing device, and the display controlling device displays one of the maps having different scales stored in the map storing device on the displaying device. When a category of facility is selected using the facility category selecting device, facilities of that selected facility category which are located in the area covered by the map displayed on the displaying device are displayed in their respective positions on that map. The map scale controlling device as necessary so changes the scale of the map displayed on the displaying device by the display controlling device that the number of facilities displayed on the map by the display controlling device is kept below the predetermined upper limit.

Thus, even in cases where for example as in the display example shown in FIG. 4B, map display is being carried out on a scale such that, because facilities exist in concentration, there are many facility marks within the map region being displayed and the roads themselves are hidden by the facility marks and consequently it is impossible to distinguish the route to a chosen facility, the map displaying apparatus described above can automatically increase the map scale so that the number of facilities being displayed on the map is kept below the predetermined upper limit (see FIG. 4C). Because the apparatus itself carries out the scale change automatically in this way, without the user himself or herself having to understand these facility mark display states and change the scale of the map being displayed to a scale such that the display is easy to read, it is extremely convenient.

The processing of changing the scale of the displayed map so that the number of facilities displayed on the map by the display controlling device is kept below the predetermined upper limit can be realized for example in the following way.

First, the map scale controlling device changes the scale of the displayed map to a largest available scale and then it reduces the scale of the map one level at a time until the number of facilities displayed on the map is equal to or above a lower limit. Then, when the number of facilities is equal to or above the lower limit, the map scale controlling device determines whether or not the number of facilities is equal to or below an upper limit when the scale of the map is reduced further by one level. And then only when the number of facilities in this case is equal to or below the upper limit, it further reduces the scale of the map by one level.

Or, alternatively, the map scale controlling device first determines whether or not the number of facilities displayed is within a predetermined range defined by a predetermined lower limit and a predetermined upper limit. When the number of facilities is below the lower limit, it reduces the scale of the map one level at a time until the number of facilities displayed on the map is equal to or above the lower limit. When the number of facilities is equal to or above the lower limit, it determines whether or not the number of facilities is equal to or below the upper limit when the scale of the map is further reduced by one level. Only when the number of facilities in this case is equal to or below the upper limit, it further reduces the scale of the map by one level. When on the other hand the number of facilities initially exceeds the upper limit, it increases the scale of the map until the number of facilities displayed on the map is equal to or below the upper limit. Of course, the scale of the displayed map can be so changed that the number of facilities displayed is kept equal to or below a predetermined upper limit by a method other than those described above.

There may also be cases wherein not a single facility is displayed on the displayed map even when the scale of the map is reduced to a smallest available scale. In this case, it is preferably displayed on the displaying device that no facility can be displayed.

As the above-mentioned predetermined range, for example the lower limit is made 1 and the upper limit is made 50. The upper limit and lower limit values of the predetermined range are of course not limited to these examples, but a certain amount of allowance is necessary in the range of values. That is, if a narrow range of for example from a lower limit of 10 to an upper limit of 20 is set there will be more cases wherein no map of corresponding scale exists, and such a narrow range is therefore unrealistic.

Also, there may be situations wherein after control automatically keeping the number of facilities within a predetermined range has been carried out a user wants to further increase the scale by one level or reduce the scale by one level. For example when facilities are concentrated locally it may be beneficial to further increase the scale of the map to help distinguish between them. Accordingly, scale selecting device for selecting a scale of map to be displayed on the displaying device may be provided so that, after the map scale controlling device has so changed the scale of the map that the number of facilities displayed is kept to within a predetermined range, a scale of map can be selected using the scale selecting device. In this case, the map scale controlling device can find a map of this selected scale from the map storing device and change the map displayed on the displaying device by the display controlling device to a map of the selected scale. When this is done, the user can as necessary carry out fine control of the scale of the displayed map.

Also, present position detecting device for detecting the present position of the vehicle may be provided and the display controlling device constructed to display a map of the vicinity of the present position detected by the present position detecting device with that present position at its center.

To achieve the above-mentioned second object, the invention provides a searching system which, when in a search for specified facilities in the vicinity of a given location on a map the number of facilities of a selected category exceeds a preset upper limit, only searches facilities located in a predetermined region centering on the vicinity of the given location. By this means, the number of facilities searched can be kept below a preset upper limit. Therefore, even when there are a large number of facilities of the selected category it is possible for a facility search to be carried out relatively quickly. Also, because the facility search is carried out with a range close to the given location being given priority, the information produced by the search is more useful to the user.

In this searching system, when the number of facilities of the selected category is no greater than the preset upper limit, a searching device may search for all the facilities of the selected category. In this case, the search processing time can be kept short even though all the facilities are being searched for.

Also, in the searching system described above, by the predetermined region being enlarged until the number of facilities of the selected category is equal to or above a preset lower limit, it is possible to search for a suitable number of facilities equal to or above the preset lower limit in a range as close as possible to the given location.

By stopping the enlargement of the predetermined region when the number of facilities is below the preset lower limit even when the predetermined region has been enlarged to a maximum range, it is possible to prevent unnecessary prolongation of the search time.

Also, when the number of facilities is below the preset lower limit even when the predetermined region has been enlarged to a first maximum range, because the number of facilities existing per unit area of the map is very small, even when the predetermined region is enlarged the number of facilities will not increase quickly. Therefore, by greatly increasing the rate of enlargement of the predetermined region, that is, by enlarging the predetermined region toward a second maximum range at the increased rate, it is possible to find a number of facilities equal to or above the preset lower limit in a range close to the given location swiftly.

In the searching system described above, it is possible to provide a category selecting device with which a category of facility can be selected and facilities of the selected category in the vicinity of a given location can then be searched for. Here, category of facility means for example Bank, Gas Station, or Park.

When a plurality of categories of facility are selected using the category selecting device, the searching system may search for facilities of all the categories selected by the category selecting device.

And not only a category of facility but also a distinction based on characteristics of facilities can be specified and facilities of the specified distinction then searched from among facilities of the specified category in the vicinity of a given location. Here, distinction based on characteristics of facilities means for example the name of a bank when the category is Bank, the name of a petroleum company when the category is Gas Station, or the type of a restaurant (for example Japanese, Chinese or French) when the category is Restaurant.

The searching system described above may also comprise a position detecting device for detecting the present position, and the searching device may search facilities using the present position detected by the position detecting device as the given location.

In the searching system described above, an information search particularly useful to the user can be carried out by facilities found by the searching device being rearranged in the order of their proximity to the given location by a rearrangement processing device and displayed in the form of a list.

In the searching system described above, by the above-mentioned preset upper limit being set in correspondence with a total time made up of the time required for the search processing carried out by the searching device and the time required for the rearrangement processing carried out by the rearrangement processing device, the search processing time can be kept short. Therefore, by the above-mentioned total time being set to a maximum time that a user will tolerate (normally about two to three seconds) it is possible to prevent the patience of the user from being unnecessarily strained.

The searching device in the searching system described above can be realized by means of a computer-readable recording medium recorded with a computer program.

That is, means for realizing the searching device in the searching system described above can be provided as a program to be executed by a computer system. This program is recorded on a computer-readable recording medium such as a semiconductor memory, a hard disc, a floppy disc, a data card (for example an IC card or a magnetic card), an optical disc (CD-ROM, DVD or the like), an opto-magnetic disc (for example an MD), a phase change disc or magnetic tape, and is loaded into a computer system as necessary for use. Alternatively, the program may be recorded on a ROM or a backup RAM as the computer-readable memory and this ROM or backup RAM then built into a computer system.

BRIEF DESCRIPTION OF THE DRAWINGS

These and other objects, features and characteristics of the present invention will be appreciated from a study of the following detailed description, the appended claims, and drawings, all of which from a part of this application. In the drawings:

FIGS. 10A through 10D are schematic views illustrating processing carried out in the second preferred embodiment;

FIGS. 11A through 11C are further schematic views illustrating processing carried out in the second preferred embodiment.

DETAILED DESCRIPTION OF THE PREFERRED EMBODIMENTS

First Preferred Embodiment

Figure 1:
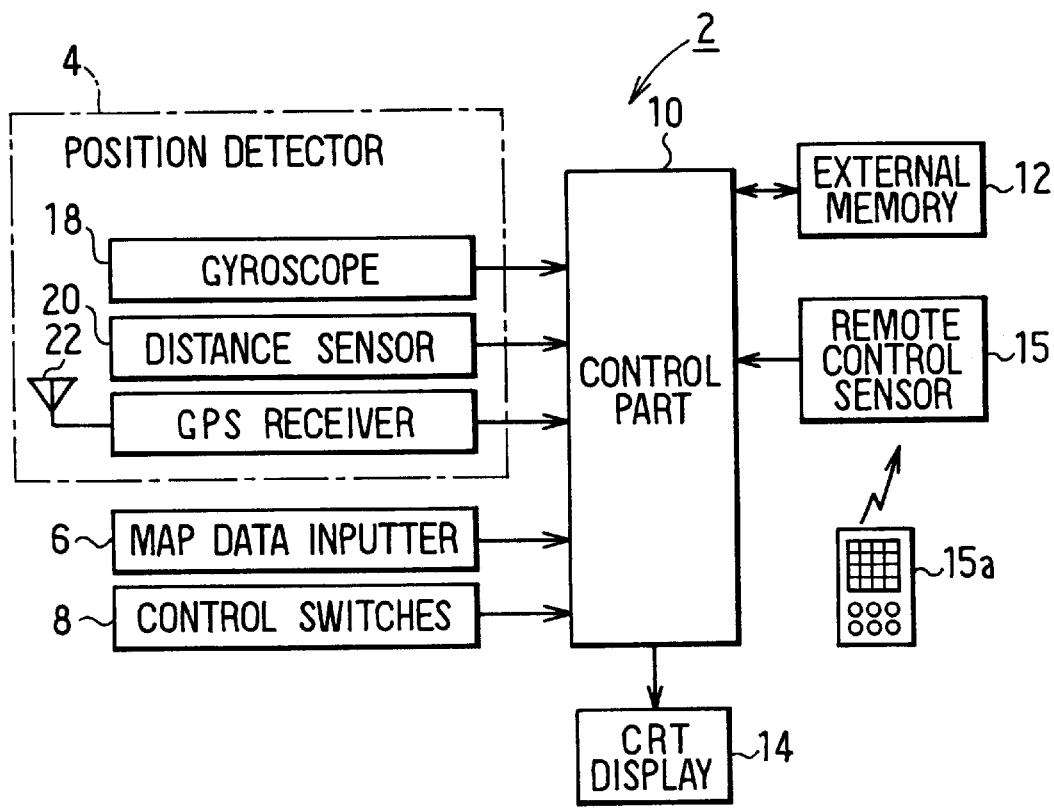
FIG. 1 is a block diagram showing the overall construction of a map displaying apparatus for mounting in a vehicle according to a first preferred embodiment of the present invention.

As shown in FIG. 1, a map displaying apparatus 2 comprises a position detector 4, a map data inputter 6, control switches 8, an external memory 12, a display 14 and a remote control sensor 15, and a control part 10 connected to these. The control part 10 consists of an ordinary computer, and inside it are a CPU, ROM, RAM, an I/O circuit, and bus lines connecting these together.

The position detector 4 has a gyroscope 18, a distance sensor 20, and a GPS (Global Positioning System) receiver 22 for detecting the position of the vehicle in which the map displaying apparatus 2 is installed on the basis of radio waves from satellites, all three of these devices constituting known technology.

Because these devices 18, 20 and 22 all have errors of different kinds, in using them the position detector 4 is constructed to interpolate their outputs. Depending on the accuracy of the above-mentioned devices one or more of them may be dispensed with, and also a steering rotation sensor, or wheel speed sensors of driven wheels or the like may be used as the position detector 4.

The map data inputter 6 is a device for inputting data including so-called map matching data for increasing the accuracy of the position detection, map data, and facility data to the control part 10, which will be further discussed later. As the recording medium of the map data inputter 6, because the amount of data is large, a CD-ROM is normally used, but for example another medium such as a DVD or a memory card may alternatively be used.

The map data is data constituting maps by connecting together multiple nodes such as intersections with links, and with respect to each of the links is stored link information made up of a unique number specifying the link (the link ID), a link length showing the length of the link, X and Y coordinates of a starting end and a finishing end of the link, and a road width and a road type of the link (indicating road information such as that the road is a toll road). The construction of this map data using link information and so on is the same as in related art. However, in the case of this preferred embodiment, for displaying maps having different scales on the display 14, a plurality of maps expressing a predetermined geographical area on four different scales such that the length of about one tenth of the width of the display screen is equivalent to A, B, C and D respectively are stored as map data. The relationships between the above-mentioned four lengths A, B, C, D are made D=4C, C=4B, B=4A. Each of the maps can be displayed reduced in size by ½ (halved in scale), and thus map display on eight different scales such that the length of about one tenth of the width of the display screen is equivalent to A, 2A, B, 2B, C, 2C, D and 2D is possible. Using A as a reference length, the above-mentioned eight lengths can also be expressed as A, 2A, 4A, 8A, 16A, 32A, 64A and 128A.

The facility data is data for showing facilities that can be displayed on a displayed map. For each facility, for example, a facility category and a position of the facility when displayed on a map is stored as the facility data. Facility categories include for example those denoting relatively large field areas which may also contain buildings, such as Airport, Golf Course or Park, those mainly denoting buildings themselves, such as Hotel, Hospital, City Office and Library, and those mainly denoting small installations such as ATM (Automatic Teller Machine). Facilities likely to be relatively numerous are for example restaurants, ATMs, gas stations and hotels. Conversely, large-scale facilities such as airports and ports, and special facilities such as law courts, are relatively few in number. However, even among categories of facility likely to be relatively numerous, there will be those which while being numerous in city areas are scarce in country areas and those of which the reverse is the case.

The position detector 4, the map data inputter 6, the control switches 8, the control part 10, the display 14 and the remote control sensor 15 and so on constitute a so-called navigation system. A present vehicle position mark, which will be further discussed later, responsive to the present position detected by the position detector 4; map data inputted by the map data inputter 6; and also additional data such as guide routes, names, and signs can be displayed together on the screen of the display 14.

This map displaying apparatus 2 also has a route guidance function of, when the position of a destination, and necessary specifications of a particular route (that is, specifications of points to be passed through) such as expressways and the like are inputted from a remote control terminal 15a through the remote control sensor 15 or the control switches 8, automatically selecting an optimal route from the present position to that destination and displaying a corresponding guide route on the display 14. As methods for automatically setting an optimal route like this, the Dikstra method and the like are known. The control switches 8 are for example touch switches integral with the display 14 or mechanical switches, and are used to make various inputs. This setting and displaying of a guide route is not a principle characterizing part of the present invention and therefore will not be explained in detail here.

Next, of processing executed by the control part 10, facility display processing will now be described with reference to the flow chart of FIG. 2.

First, processing for displaying a map to be displayed is carried out (S110). As the selection of this map to be displayed, for example a user himself or herself may specify a map of a geographical area that he or she wants to be displayed, or alternatively the user may leave this selection to processing automatically displaying a map of the vicinity of the present position. When a present position vicinity map is automatically displayed, the present position of the vehicle is calculated from a signal from the position detector 4 and a present position vicinity map is read from a CD-ROM set in the map data inputter 6 and displayed. When on the other hand the user wants to specify a map of an area that he or she wants to be displayed, he or she may do so by specifying a place name or the like or by scrolling displayed maps.

Then, when a facility display switch among the control switches 8 is pressed (S120), a facility category selection window is displayed (S130). These facility categories, as mentioned above, are for example Airport, Golf Course, Park, Hotel, Hospital, City Office, Library, Restaurant, ATM, Gas Station and so on.

When one of these facility categories is selected by the user (S140), in the following S150, the scale of the map displayed on the display 14 is automatically changed to the most detailed map scale available and facility marks M are displayed in the positions of respective facilities on that map.

In S160, it is determined whether or not at least one facility is displayed on the map. When at least one facility is displayed on the map (S160: YES), processing proceeds to S170 and calculates the number of facilities (n) that would appear on a map of a scale one level smaller (a map whose geographical coverage is one level greater). In the following S180, it is determined whether or not this number of facilities n is greater than 50. When the number of facilities n is greater than 50 (S180: YES), the present processing ends directly. But, when the number of facilities n is equal to or below 50 (S180: NO), the processing proceeds to S190 and the map being displayed is automatically changed to a map of a scale one level smaller (a map whose geographical coverage is one level greater). Processing then returns to S170.

When in S160 a negative determination is made, that is, when not even one facility is displayed on the map, processing proceeds to S200. In S200, it is determined whether or not the display state of the map is at the smallest scale at which facilities can be displayed. If it is at the smallest scale (S200: YES), a message display saying, No facilities can be displayed. is displayed on the display 14 (S210), and the present processing ends. When on the other hand the present scale is not the smallest scale at which facilities can be displayed (S200: NO), the map displayed is automatically changed to a map one level smaller in scale (a map one level greater in geographical coverage) (S220), after which the processing returns to S160.

Figure 2:
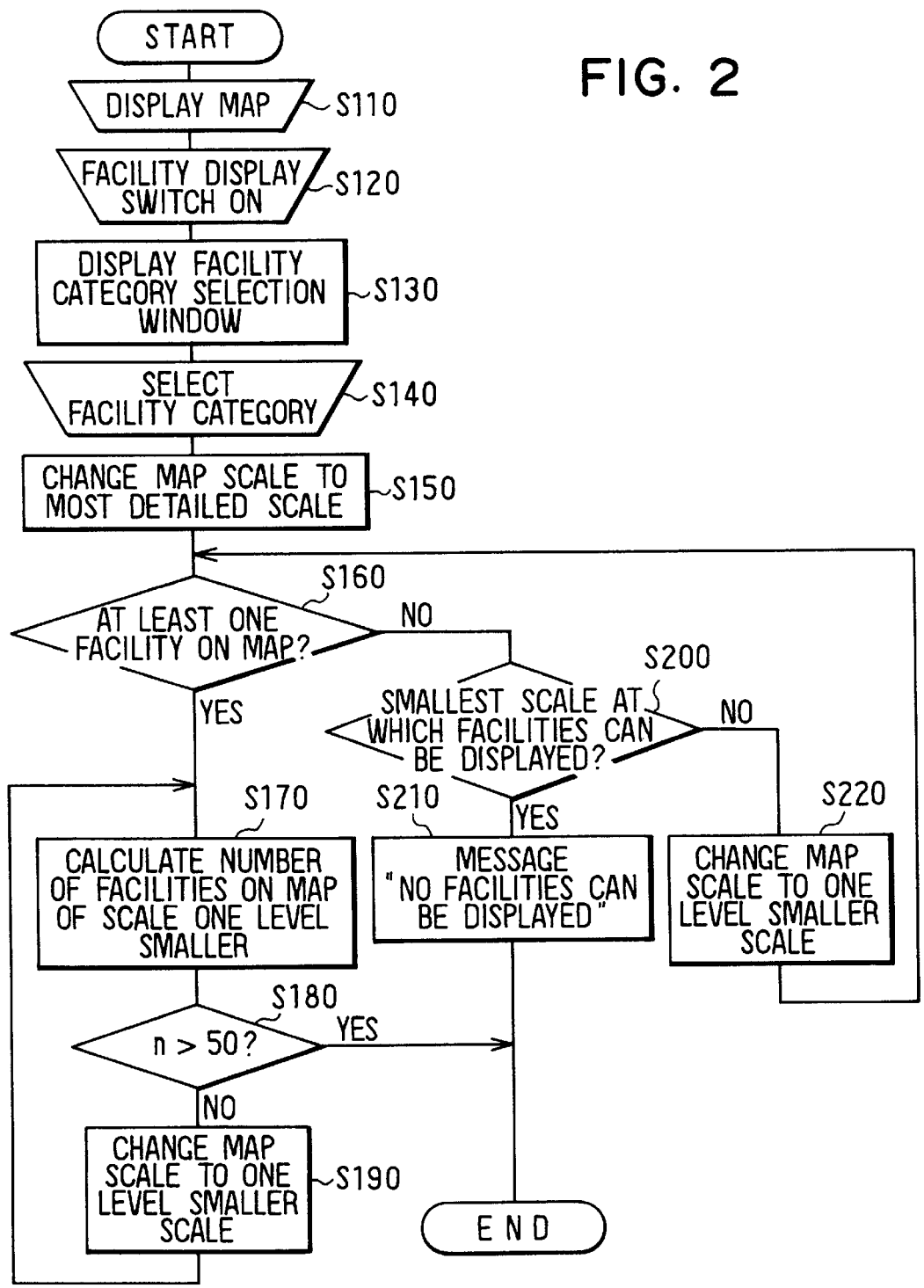
FIG. 2 is a flow chart showing facility display processing executed in a control part of the first preferred embodiment.

In this way, in the case of the processing shown in FIG. 2, when a category of facility to be displayed is selected (S140), first the map being displayed is changed to a map of the most detailed (largest) scale available (S150), and then the scale of the map is reduced (its geographical coverage is increased) by one level at a time until the number of facilities displayed on the map is at least a lower limit of 1 (S160, S200, S220). Then, when the number of facilities n has become at least 1 (S160: YES), it is determined whether or not the number of facilities that would appear on a map one level larger in geographical coverage is equal to or below an upper limit of 50 (S180). Only when that number of facilities n is equal to or below the upper limit of 50 (S180: NO), the map is automatically changed to a map one level larger in geographical coverage (one level smaller in scale) (S190).

Figure 4A:
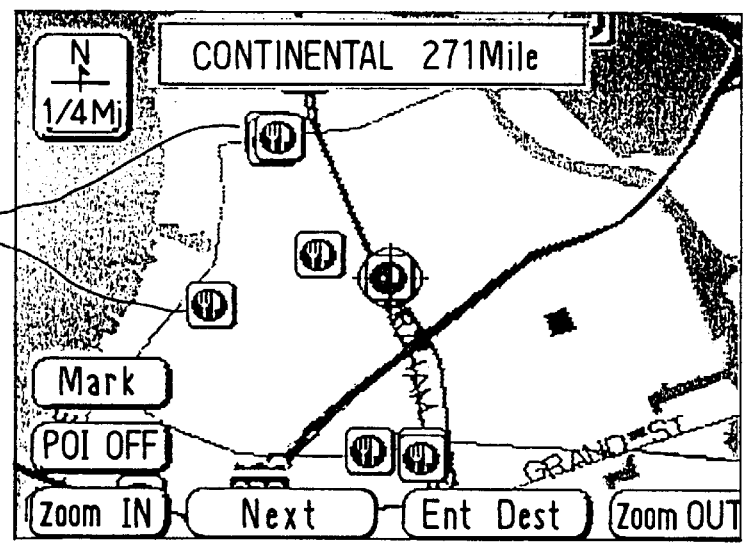
FIGS. 4A through 4C are views showing facility display examples.
Figure 4B:
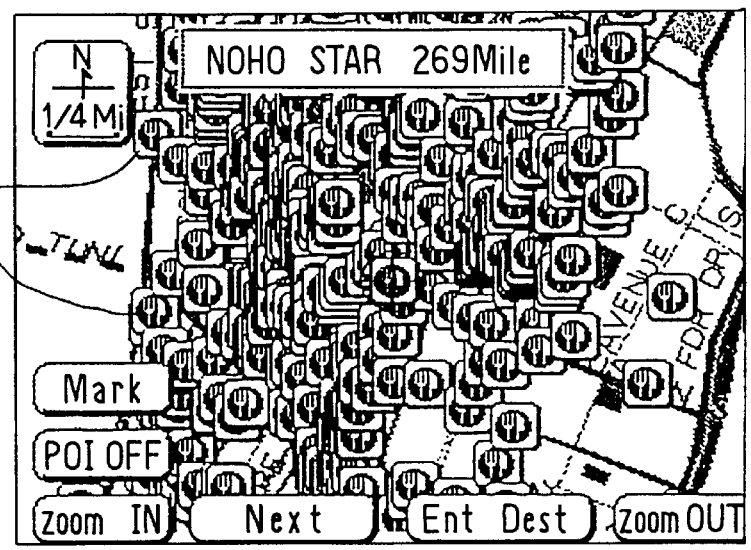
Figure 4C:
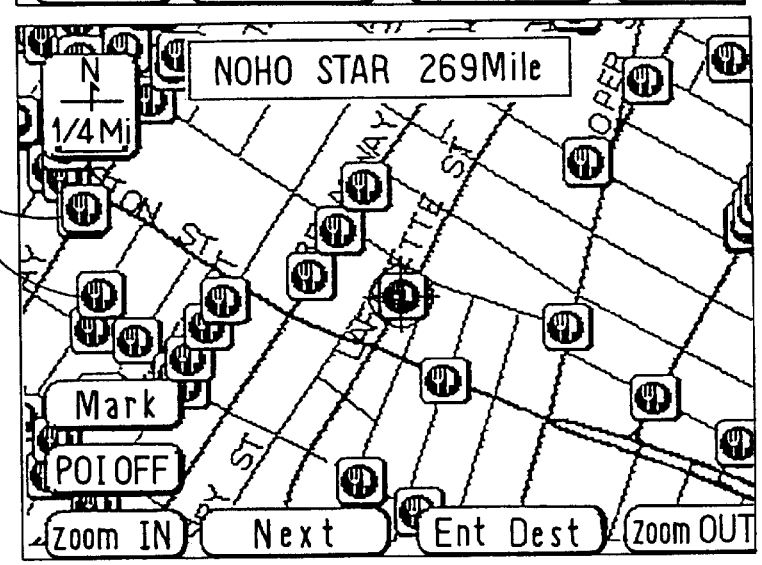

Therefore, even in cases such that, for example as in the display example shown in FIG. 4B, map display would be carried out at a scale such that because there is a high concentration of facilities of the selected category there are many facility marks in the map region being displayed and the roads themselves are hidden and it is impossible for the route to a chosen facility to be distinguished, according to the map displaying apparatus 2, the map scale is automatically increased so that the number of facilities n displayed on the map is kept equal to or below the upper limit of 50. As a result, map display is effected with a suitable scale like that illustrated in FIG. 4C. When on the other hand there are no facility marks whatsoever in the map region being displayed, the scale of the map display is reversely reduced until at least one facility mark does appear. In this way, the extremely valuable convenience that the apparatus itself automatically performs scale changes, without the user having to understand these facility mark display states and carry out an operation himself or herself to change the scale to one which is easy to read, is realized.

Also, when no facility is displayed on the map even when the scale of the displayed map has been changed to a smallest scale (greatest coverage) (S200: YES), a message to the effect that no facility that can be displayed exists is displayed on the display 14 (S210). Thus the convenience that this situation is made clear to the user is realized.

In this preferred embodiment, the display 14 is displaying means, the position detector 4 is present position detecting means, the control switches 8 are facility category selecting means, and the map data inputter 6 and the CD-ROM set therein are map storing means and facility storing means. Also, the processing of steps S150 through S200 of the flow chart of FIG. 2 constitutes map scale controlling means.

The aspect of the present invention illustrated by the first preferred embodiment described above is not limited to this preferred embodiment and can be practiced in various other embodiments.

For example, although, in the first preferred embodiment described above, first the scale of the displayed map is changed to a most detailed (largest) scale (S150) and then if necessary the map scale is changed (reduced) to increase the geographical coverage of the map one level at a time, alternatively it may be determined whether or not the number of facilities displayed n is within a predetermined range and processing then carried out on the basis of the result of that determination. An example of processing for this case is shown in the flow chart of FIG. 3.

Figure 3:
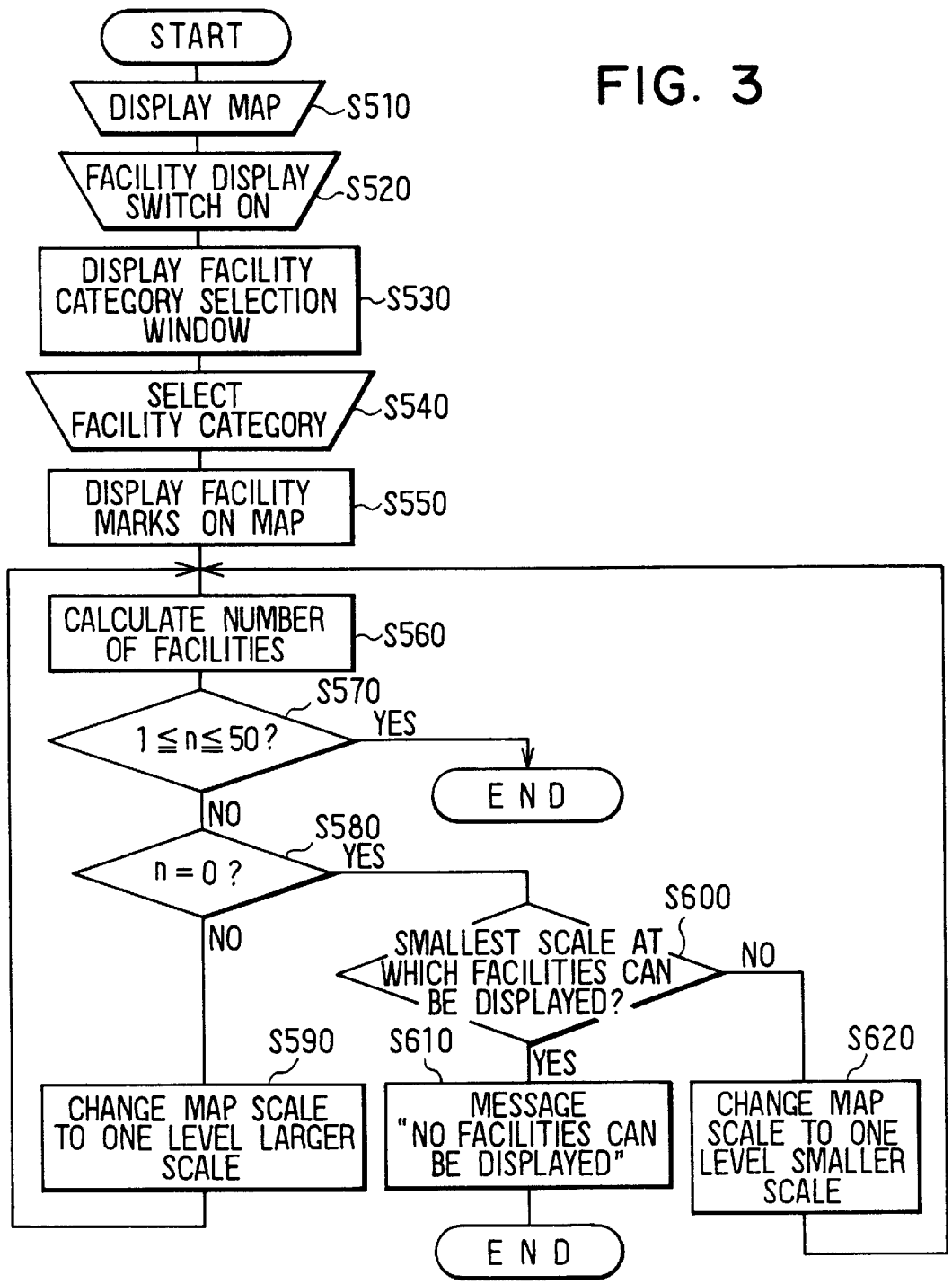
FIG. 3 is a flow chart showing another version of the facility display processing.

Because the processing of S510 through S540 of the flow chart of FIG. 3 is the same as the processing of S110 through S140 of the flow chart of FIG. 2 it will not be described again here and only the processing of S550 onward will be described. Whereas in the case of the flow chart of FIG. 2 at this point the scale of the displayed map is changed to a most detailed (largest) scale, in S550 of FIG. 3, the scale of the map having been displayed in S510 is not changed and instead processing for displaying facility marks M in their respective positions is simply carried out.

Then, the number of facilities (n) is calculated (S560), and it is determined whether or not the number of facilities n is in a predetermined range, for example $1 \leq n \leq 50$ (S570). If $1 \leq n \leq 50$ (S570: YES), because n is already in the predetermined range, it is not necessary for the scale to be changed and therefore processing ends directly.

If on the other hand $1 \leq n \leq 50$ is not satisfied (S570: NO), in the following S580 it is determined whether or not the number of facilities n is 0.

If n is not 0 (S580: NO), because this means that n>50, processing proceeds to S590 and automatically changes the scale of the map to a geographical coverage smaller (a scale larger) by one level. Processing then returns to S560 and calculates the number of facilities n again and the processing of S570 and S580 above is repeated. That is, because in this case the number of facilities initially is too great, the scale of the map displayed is increased (the geographical coverage of the map is decreased) by one level at a time until $1 \leq n \leq 50$ (S570: YES), whereupon the present processing ends.

If the determination in S580 is positive, i.e. if n=0, then processing proceeds to S600. In S600, it is determined whether or not the display state at the present is at the smallest scale at which facilities can be displayed. If it is at the smallest scale (S600: YES), a message display saying, No facilities can be displayed. is displayed on the display 14 (S610), after which the present processing ends. When on the other hand the present scale is not the smallest scale at which facilities can be displayed (S600: NO), the map displayed is automatically changed to a map one level smaller in scale (a map one level greater in geographical coverage) (S620), after which the processing returns to S560. The processing of these steps S600 through S620 is the same as the processing of S200 through S220 in the flow chart of FIG. 2.

Thus, in the processing shown in FIG. 3, if the number of facilities n is initially smaller than the lower limit value 1 of the predetermined range ($1 \leq n \leq 50$) (i.e. if n=0), the scale of the map displayed is reduced (the geographical coverage is widened) by one level at a time, and conversely when n is greater than the upper limit value 50 the scale of the map displayed is increased (the geographical coverage is narrowed) by one level at a time, until finally the number of facilities displayed n is in the predetermined range ($1 \leq n \leq 50$). In this case also, the extremely valuable convenience that the apparatus itself automatically performs scale changes, without the user having to understand these facility mark display states and carry out an operation himself or herself to change the scale to one which is easy to read, is realized.

In both versions of the first preferred embodiment described above, control automatically bringing the number of facilities n to within a predetermined range is carried out; however, it can be anticipated that there will be times when, after the results of this control have been displayed, the user will want to further increase the scale or reduce the scale by one level. For example when facilities are concentrated locally it may be beneficial to further increase the scale of the map to help distinguish between them. Accordingly, a switch for changing the scale is preferably provided among the control switches 8. In this case, the control switches 8 are equivalent to scale selecting means. When this is done, the user can carry out fine adjustment of the scale of the displayed map.

Although in the preferred embodiment described above the lower limit value of the predetermined range is 1 and the upper limit value is 50, this is merely an example, and other upper limit and lower limit values may of course be used.

Similarly, although in the preferred embodiment described above there are eight scale levels, the number of scale levels between which the display can be changed may be made larger or smaller; and whereas in the preferred embodiment described above the scale changed by a factor of two from one level to the next, it may alternatively be made to change by a factor of for example four.

Second Preferred Embodiment

A second preferred embodiment of the invention will now be described. In this second preferred embodiment also, as in the first preferred embodiment, the invention is applied to a car navigation system.

Figure 5:
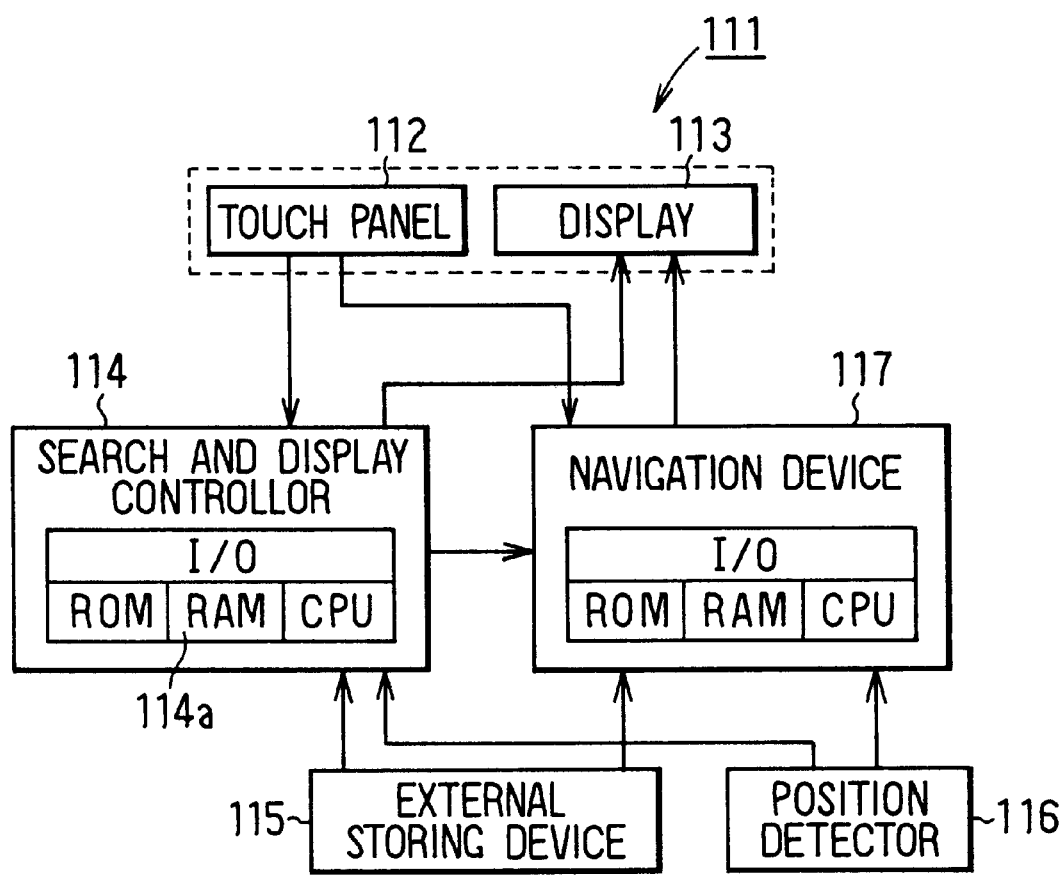
FIG. 5 is a block diagram showing the construction of a second preferred embodiment of the present invention.

FIG. 5 is a block diagram showing the construction of the car navigation system 111 of this preferred embodiment.

The car navigation system 111 is mounted in the passenger compartment of a car and is made up of a touch panel 112, a display 113, a search and display controller 114, an external storing device 115, a position detector 116 and a navigation device 117.

Figure 6A:
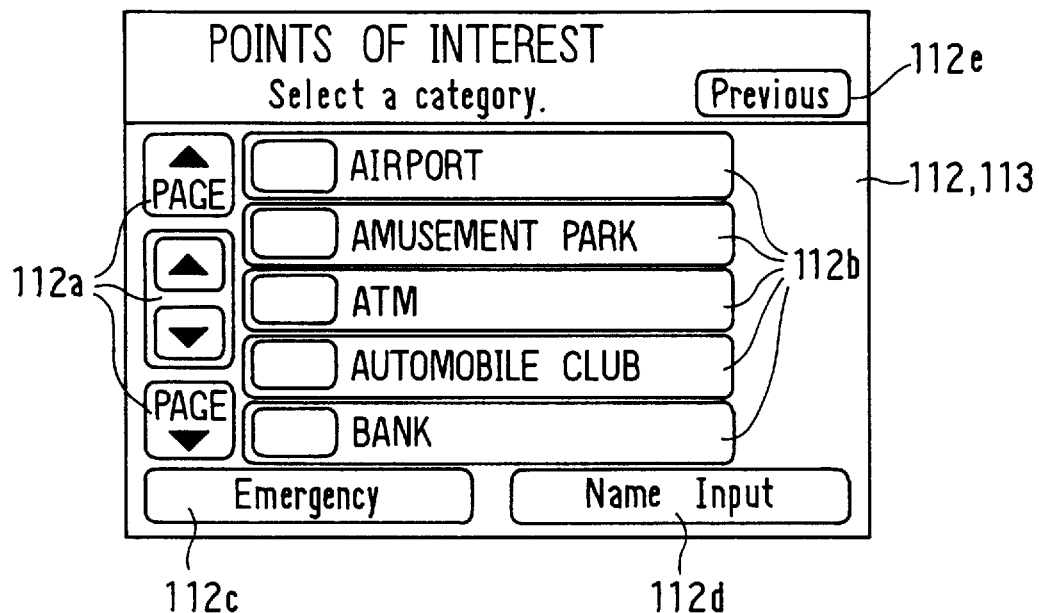
FIGS. 6A and 6B are views illustrating display examples in the second preferred embodiment.
Figure 6B:
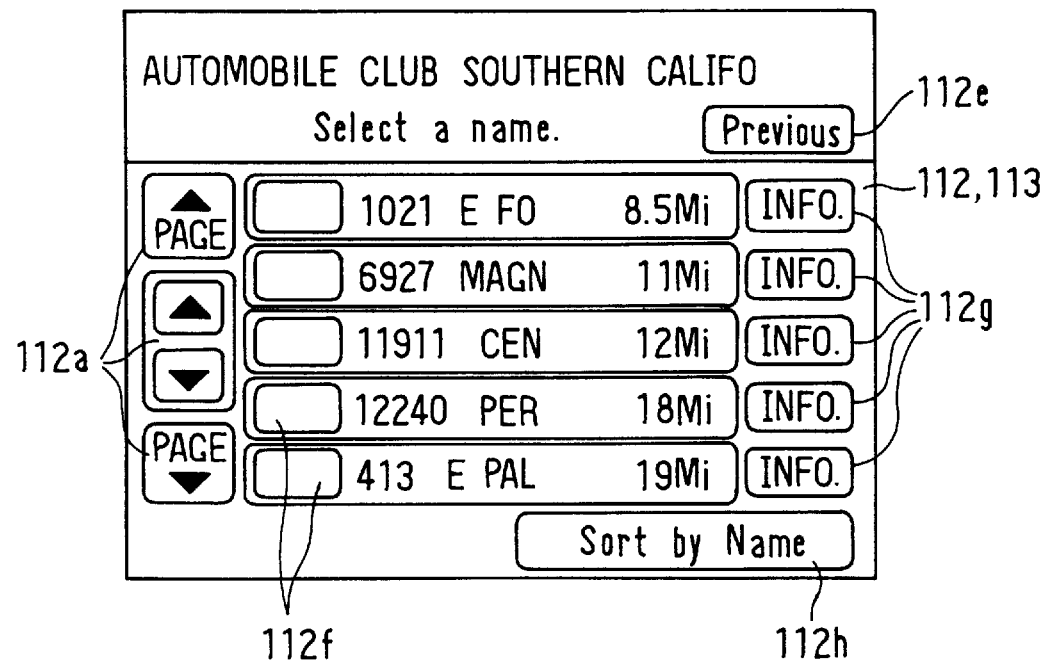

FIGS. 6A and 6B both show an input screen of the touch panel 112 and a display picture of the display 113.

The touch panel 112 and the display 113 are integrated, the touch panel 112 being laminated to the display. The touch panel 112 may be any of various types such as pressure-sensitive type, electromagnetic induction type, static capacitance type or a combination of these. The display 113 may for example be a liquid crystal display, a plasma display or a CRT.

The touch panel 112 functions as control switches for operating the search and display controller 114 and the navigation device 117. On the input screen of the touch panel 112 are provided operating keys 112a for scrolling up and scrolling down the display picture of the display 113 and switching to a next page or a previous page, category specifying keys 112b, 112c for specifying a category of facility (Airport, Bank, Gas Station, Park and so on), an operating key 112d for switching the display picture of the display 113 to a keyboard, an operating key 112e for returning to a previous process, facility specifying keys 112f for specifying an individual facility, operating keys 112g for displaying information relating to individual facilities (for example telephone numbers, facility descriptions and so on), and an operating key 112h for rearranging individual facilities in the alphabetical order of their names.

The position detector 116 comprises a geomagnetism sensor, a gyroscope, a steering rotation sensor, a wheel speed sensor and a GPS receiver and so on, and by known technology detects the present position of the car in which the car navigation system 111 is mounted.

The navigation device 117 comprises an ordinary microcomputer having an I/O circuit, a CPU, ROM and RAM, and is supplied with power from a car battery (not shown) when a power supply switch (not shown) of the car navigation system 111 is turned on. The navigation device 117 sequentially executes program commands stored in its built-in ROM or in the external storing device 115 on the basis of signals from the touch panel 112 inputted through the I/O circuit, and using known technology such as the Dikstra method selects an optimal route from a present position detected by the position detector 116 to a facility specified with the search and display controller 114. The navigation device 117 also refers to map data files stored in the external storing device 115 and displays the present position detected by the position detector 116 and the optimal route from the present position to the specified facility on the display device 113 along with a map.

The search and display controller 114 comprises an ordinary microcomputer having an I/O circuit, a CPU, ROM and RAM 114a, and is supplied with power from the car battery when the power supply switch of the car navigation system 111 is turned on. The search and display controller 114 sequentially executes program commands stored in its built-in ROM or in the external storing device 115 on the basis of signals from the touch panel 112 inputted through the I/O circuit and carries out processing which will be further discussed later on the basis of the present position detected by the position detector 116 and displays the results of this processing on the display device 113.

In the external storing device 115 are stored program commands for the search and display controller 114 and the navigation device 117, and map data files and facility data files, which will be further discussed later.

As the external storing device 115, because the amount of data to be stored therein is large, an optical disc (CD-ROM, DVD or the like), an opto-magnetic disc (MD or the like) or a phase change disc is generally used, but any other recording medium capable of recording the necessary amount of data, such as a semiconductor memory, a hard disc, a data card (IC card, magnetic card or the like) may alternatively be used.

The touch panel 112, the display 113, the external storing device 115 and the position detector 116 are also supplied with power from the car battery when the power supply switch of the car navigation system 111 is turned on.

Figure 7A:
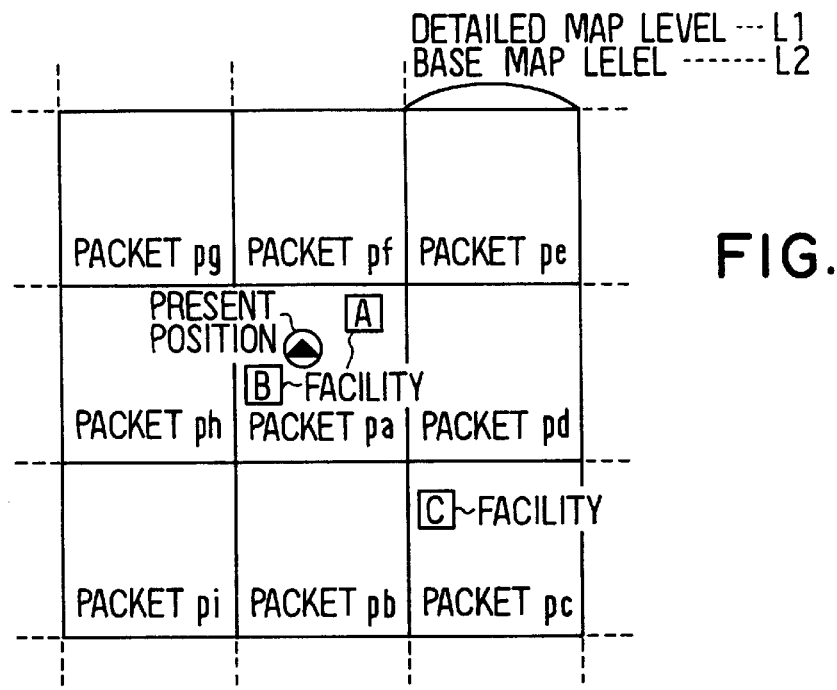
FIGS. 7A and 7B are views illustrating map data files and facility data files of the second preferred embodiment.
Figure 7B:
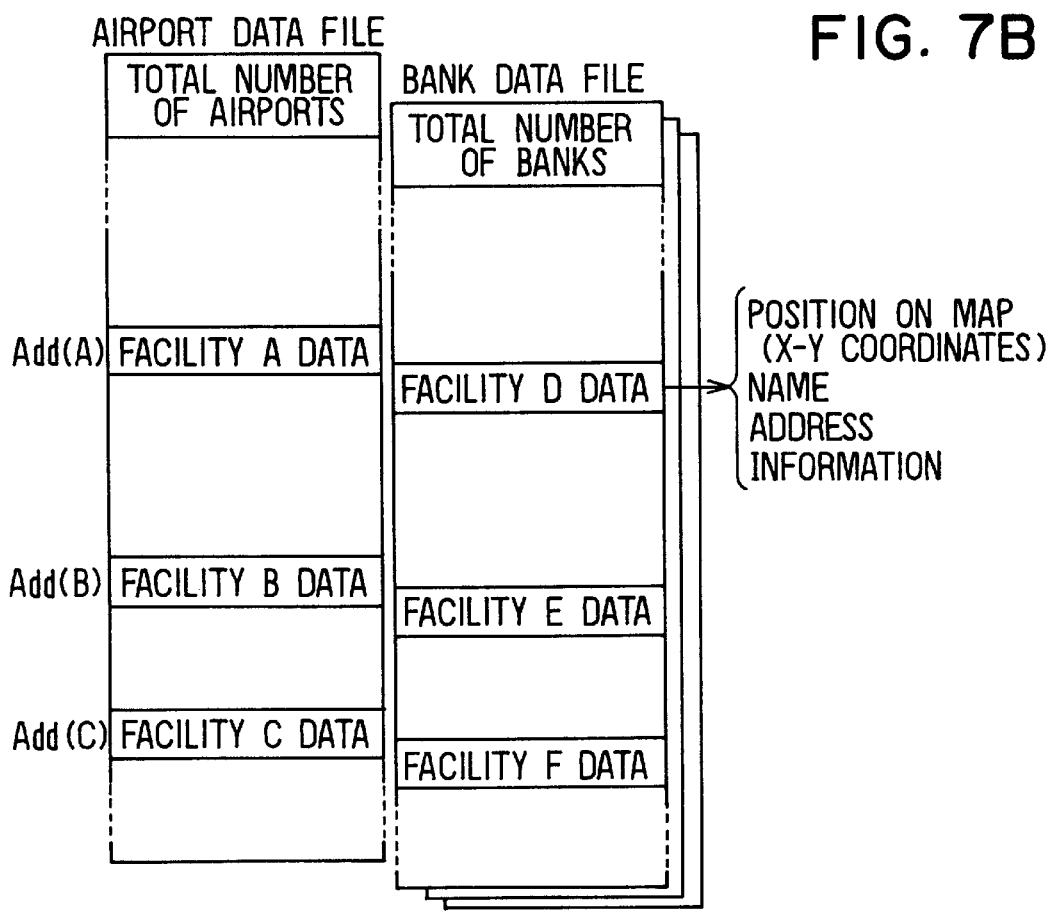

FIGS. 7A and 7B illustrate map data files and facility data files stored in the external storing device 115.

As shown in FIG. 7B, in the facility data files, for each of various facilities A, B, C . . . existing on a map stored in the map data files, various data such as the position (X-Y coordinates) of that facility on the map, the name and address of the facility and information about that facility are held in association with the facility. Also, at the head of each facility data file, for each category of facility held in that facility data file, the total number of facilities in that category is stored.

As shown in FIG. 7A, the map is divided up into packets pa, pb, . . . , pi, . . . disposed in the form of a matrix. The packets are squares of which each side is a predetermined distance long, and the distance of one side of a detailed map level packet is set at a predetermined value L1 (for example a few km) while the distance of one side of a base map level packet is set at a predetermined value L2,(for example several tens of km) greater than the predetermined value L1.

The map data files are held divided up so that there is a file for each packet. The map data file of each packet holds, for each individual facility among various facilities located in the region covered by the packet, data such as data of the category of the facility and data of a pointer to a facility data file.

Accordingly, for example when there are two facilities A and B of the same category in the region covered by the packet pa, by referring to the map data file of the packet pa it is possible to recognize that there are two facilities A and B of the same category located in the region of the packet pa and obtain data of facility data file pointers of the facilities A and B.

Here, the facility data file pointers correspond to address numbers of the data of the facilities in their facility data file. Therefore, as shown in FIG. 7B, in the facility data file, by referring to the pointers of the facilities A and B obtained from the map data file of the packet pa, it is possible to obtain the various data (position on the map, name, address, information and so on) held at the address numbers Add (A), Add (B) corresponding to the pointers of the facilities A and B.

In the same way, when in the region covered by the packet pc there is a facility C of the same category as the facilities A and B, by referring to the map data file of the packet pc it is possible to recognize that there is a facility C of the same category as the facilities A and B in the region covered by the packet pc and obtain data of a facility data file pointer of the facility C. And in the facility data file, by referring to the pointer of the facility C obtained from the map data file of the packet pc, it is possible to obtain the various data held at the address number Add (C) corresponding to the pointer of the facility C.

Next, details of processing executed by the search and display controller 114 will be described using the flow charts shown in FIG. 8 and FIG. 9.

When, after the power supply switch of the car navigation system 111 is turned on, the user selects a menu for specifying a category of facility from a menu displayed on the display 113 by means of a menu selecting key (not shown) provided on the touch panel 112, the search and display controller 114 executes the following processing.

Figure 8:
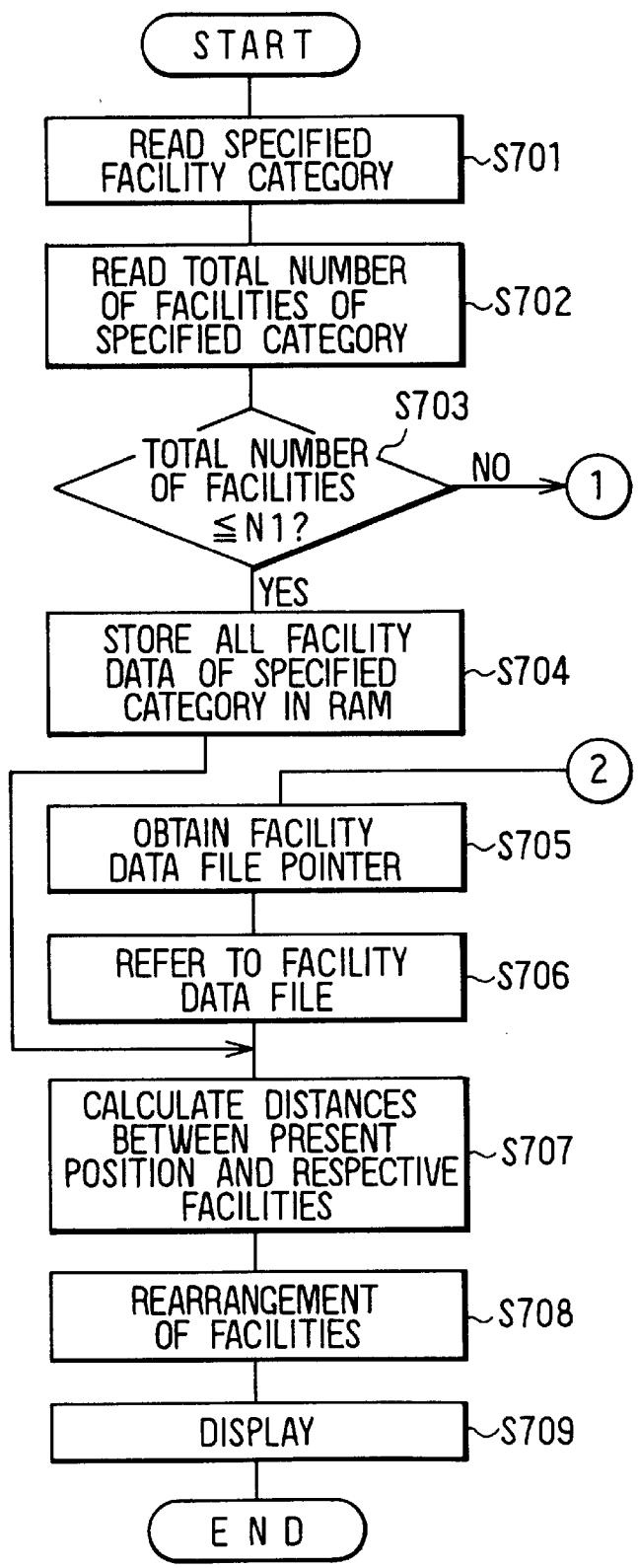
FIG. 8 is a flow chart illustrating processing carried out in the second preferred embodiment.

As shown in FIG. 8, first, in step (hereinafter abbreviated to S) 701, the facility category that the user specified is read in. That is, as shown in FIG. 6A, preset categories of facility (for example AIRPORT, AMUSEMENT PARK, ATM, AUTOMOBILE CLUB, BANK and so on) are displayed on the display screen of the display 113. Then, a facility that the user has specified by touching the category specifying key 112b is outputted to the search and display controller 114 and read in thereby as an output signal of the touch panel 112. In the following description it will be assumed that the category AUTOMOBILE CLUB has been selected.

Although in the example shown in FIG. 6A only five categories of facility are displayed on the display 113 at one time, when the user touches one of the operating keys 112a the display picture of the display 113 scrolls up or down or changes to a next page or a previous page and more preset categories of facility are thereby displayed.

Also, by touching the category specifying key 112c it is possible to specify a facility to be contacted in an emergency (for example Hospital, Car Dealer, Police Station). And by switching the touch panel 112 to a keyboard by touching the operating key 112d and then typing in a desired facility using the keyboard it is possible to specify any category of facility, besides the preset categories.

Next, in S702, processing refers to the respective facility data file stored in the external storing device 115 and reads in the total number of facilities (which are search objects) stored at the head address of the facility data file.

Then, in S703, it is determined whether or not the total number of facilities stored in the facility data file is equal to or below a predetermined value N1, and when it is equal to or below N1 processing proceeds to S704.

In S704, all the facility data of the specified facility category in the respective facility data file stored in the external storing device 115 is selected and read into the RAM 114a.

Then, in S707, from the present position detected by the position detector 116 and the positions of the facilities on the map, the distances between the present position and the facilities of the selected category are calculated.

Then, in S708, the facilities are rearranged into the order of their proximity to the present position.

Then, in S709, as shown in FIG. 6B, the addresses and the distances from the present position of the facilities thus rearranged into the order of their proximity to the present position are displayed on the display 113 in the form of a list.

Although in the example shown in FIG. 6B the addresses of only five facilities are displayed on the display 113 at one time, when the user touches one of the operating keys 112a the display picture of the display 113 scrolls up or down or changes to a next page or a previous page and the addresses of more facilities of the specified category are thereby displayed. Also, the specified category (AUTOMOBILE CLUB) is displayed at the top of the display picture of the display 113.

In this way, when the total number of facilities of the specified category stored in the facility data file is equal to or below the predetermined value N1 (S703: YES), all the facilities in the specified category are selected and these facilities are rearranged into the order of their proximity to the present position and displayed on the display 113.

Here, the predetermined value N1 is selected in correspondence with the processing time from when the user specifies a category of facility by operating the keys 112b to 112d in S701 to when the rearranged facilities are displayed on the display 113, and depends on the processing speed of the CPU of the search and display controller 114. That is, the predetermined value N1 is set so that this processing time (the time the user has to wait) is not longer than the approximate time that a user will tolerate (normally not more than two to three seconds).

Figure 9:
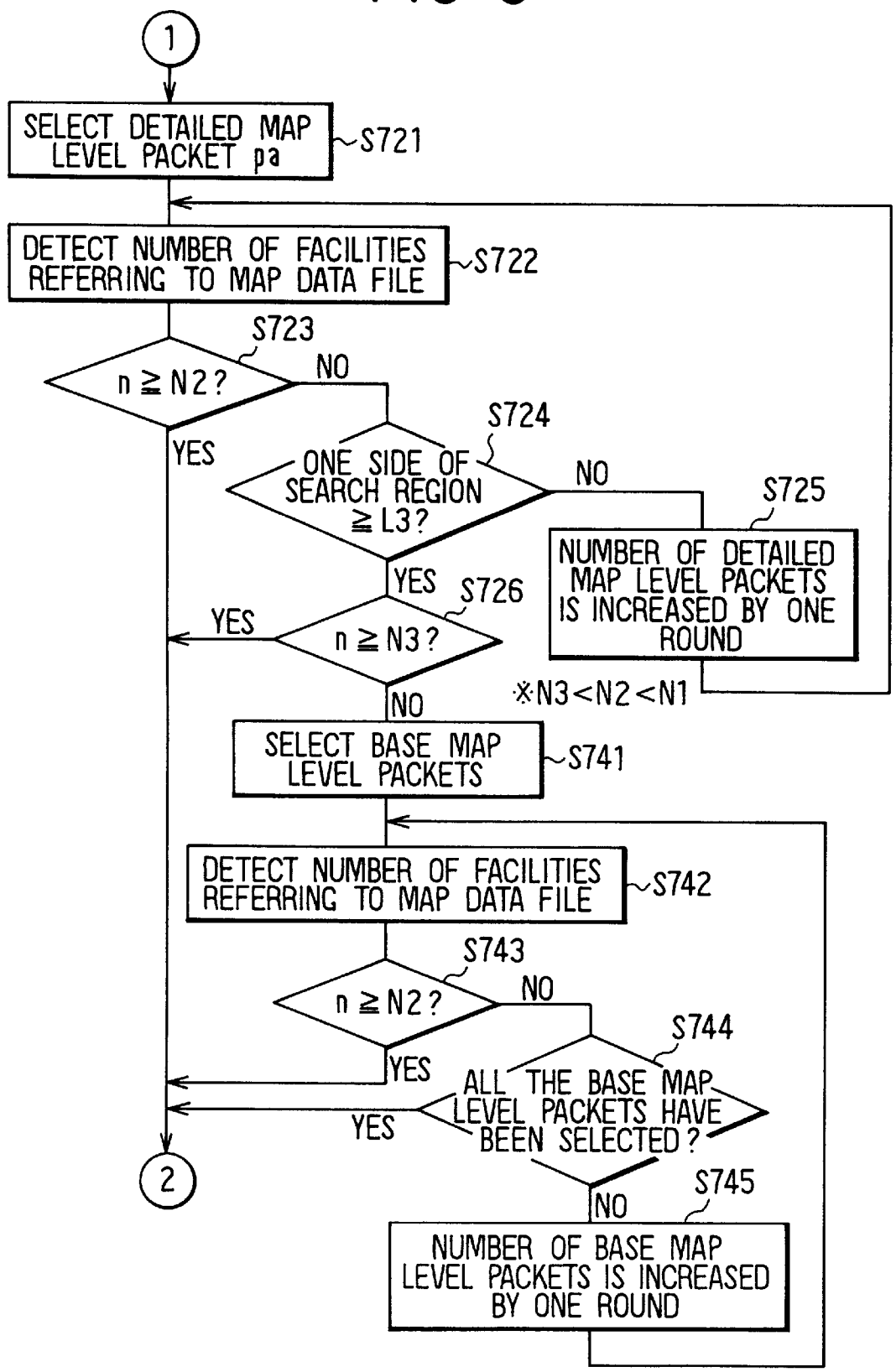
FIG. 9 is another flow chart illustrating processing carried out in the second preferred embodiment.

When in S703 it is determined that the total number of facilities stored in the facility data file exceeds the predetermined value N1, processing proceeds to a step S721 shown in FIG. 9.

In S721, as shown in FIG. 10A, the detailed map level packet pa in which the present position detected by the position detector 116 lies is selected.

Then, in S722, referring to the respective map data file, the number of facilities n of the specified category existing in the region covered by the detailed map level packet pa is detected.

Then, in S723, it is determined whether or not the number of facilities n is equal to or above a predetermined value N2. When it is equal to or above N2, processing proceeds to S705. When on the other hand it is less than N2, processing proceeds to S724.

In the step S705 shown in FIG. 8, referring to the map data file of the detailed map level packet pa in which the present position lies, for all the facilities of the specified category located in the region covered by that packet pa, data of facility data file pointers are obtained.

When processing initially shifts from S723 to S724, processing proceeds to S725 on the basis of a determination of S724 which will be further discussed later. In S725, as shown in FIG. 10B, in addition to the detailed map level packet pa, the eight detailed map level packets pb through pi surrounding the detailed map level packet pa are selected.

Next, in S722, with reference to the respective map data files, the number of facilities n of the specified category existing in the region covered by the detailed map level packets pa through pi is detected.

Figures 10B, 10C, 10D:
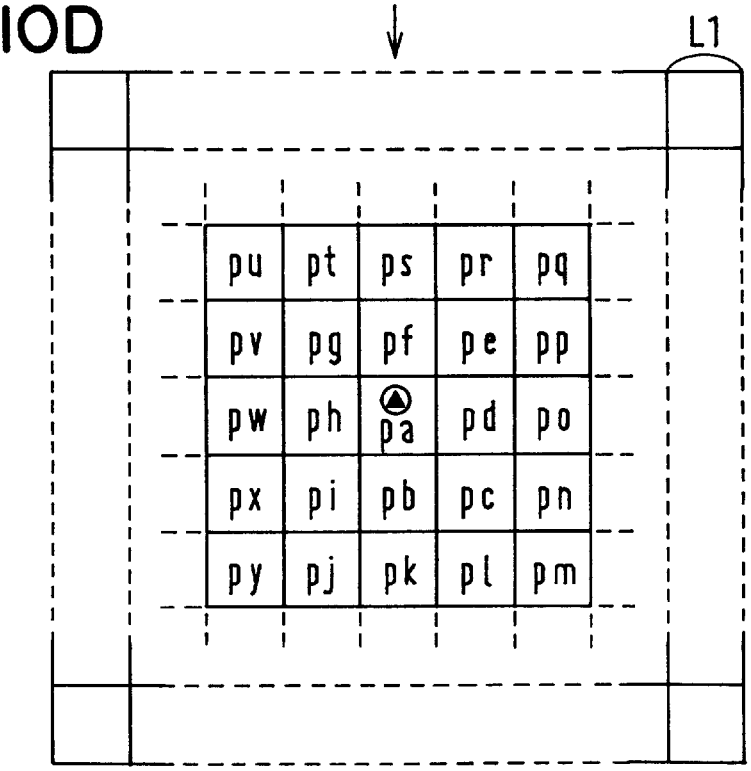

Then, when the number of facilities n of the specified category existing in the region covered by not only the detailed map level packet pa in which the present position lies but also the detailed map level packets pb through pi surrounding the detailed map level packet pa is less than the predetermined value N2, as shown in FIG. 10C the number of facilities n of the specified category existing in the region covered by twenty-five detailed map level packets pa through py obtained by adding the detailed map level packets pj through py surrounding the detailed map level packets pa through pi is detected.

By the processing of S722 through S725 being repeated like this, the number of detailed map level packets selected is increased with the detailed map level packet pa in which the present position lies as a center until the number of facilities n is equal to or above the predetermined value N2, as shown in FIGS. 10A–10D. As a result, the scope on the map of the search for facilities of the specified category is widened.

That is, when the user specifies a category, what the user wants to know about normally is facilities that are close to the present position of the vehicle and can be reached quickly. Accordingly, first, the detailed map level packet pa in which the present position lies is selected (S721). When the number of facilities n of the specified category existing in the region covered by that packet pa is equal to or above the predetermined value N2 (S723: YES), because there are enough facilities of the specified category in the vicinity of the present position, it is determined that it is not necessary for the scope on the map of the search for facilities to be widened any further. All the facilities of the specified category located in the region covered by the selected detailed map level packet pa are then rearranged into the order of their proximity to the present position and displayed in this order on the display 113 in the form of a list (S705 through S709).

However, when the number of facilities n of the specified category existing in the region covered by the detailed map level packet pa is less than the predetermined value N2 (S723: NO), because there are not enough facilities of the specified category in the vicinity of the present position, it is determined that it is necessary for the scope on the map of the search for facilities to be enlarged. Then, in addition to the detailed map level packet pa the eight detailed map level packets pb through pi surrounding the detailed map level packet pa are selected (S725). If the number of facilities n of the specified category existing in the region covered by the packets pa through pi is equal to or above the predetermined value N2, all the facilities of the specified category located in the region covered by the selected packets pa through pi are then rearranged into the order of their proximity to the present position and displayed in this order on the display 113 in the form of a list. However, when the number of facilities n of the specified category existing in the region covered by the detailed map level packets pa through pi is less than the predetermined value N2, in addition to the packets pa through pi the sixteen detailed map level packets pj through py surrounding them are selected. It is determined whether or not the number of facilities n of the specified category existing in the region covered by the twenty-five detailed map level packets pa through py is equal to or above the predetermined value N2.

In this way, by the scope on the map of the search for facilities being enlarged with the detailed map level packet pa in which the present position lies as a center one round of surrounding detailed map level packets at a time, a search for the necessary number of facilities (not less than the predetermined value N2) is carried out in a range as close as possible to the present position of the vehicle. The predetermined value N2 is set to a value less than the predetermined value N1 (N2<N1).

In S724, when as shown in FIG. 10D the distance of one side of the region covered collectively by all the selected detailed map level packets is equal to or above a predetermined value L3, processing proceeds to S726.

In S726, it is determined whether or not the number of facilities n is equal to or above a predetermined value N3, and if it is equal to or above N3 then processing proceeds to S705. If on the other hand it is less than N3 then processing proceeds to S741.

That is, when the scope on the map of the search for facilities has been widened to the predetermined value L3 square (S724: YES), although the number of facilities n of the specified category existing in that search scope is less than the predetermined value N2 (S723: NO), if the number of facilities n is equal to or above a predetermined value N3 smaller than the predetermined value N2 (N3<N2) (S726: YES), it is determined that it is not necessary for the scope of the search for facilities to be enlarged any further. All the facilities of the specified category existing in the region covered by the predetermined value L3 square are then rearranged into the order of their proximity to the present position and displayed in this order on the display 113 in the form of a list. This is because even if the search scope is indiscriminately widened to include facilities very far from the present position this information is not useful to the driver, and facilities a long way from the present position can be ignored in practice without causing any problems.

Here, the number of facilities existing per unit area on the map differs depending on the category of facility. For example, whereas there may be only one airport in a considerably large region there may be many banks or the like in a small region. The number of facilities existing per unit area on a map also differs greatly between urban areas and unpopulated areas. For example, whereas there is a certain density of gas stations even in unpopulated areas, banks and the like are concentrated in urban areas and are extremely scarce in unpopulated areas. Consequently, although the predetermined values N2, N3 and L3 may be made the same for all facilities irrespective of category, it may be preferable for them to be made to differ according to category of facility.

Next, in S741, the selected packets are changed from detailed map level packets to base map level packets. That is, as shown in FIG. 11B, in addition to the base map level packet pa in which the present position lies the eight base map level packets pb through pi surrounding this packet pa are selected. Here, as shown in FIGS. 11A and 11B, the predetermined value L2 (the distance of one side of a base map level packet) is set so that the distance L4 of one side of the region covered collectively by all the selected basic level packets pa through pi is equal to or above the predetermined value L3 (L4≦L3).

Next, in S742, referring to the respective map data files, the number of facilities n of the specified category existing in the region covered by the base map level packets pa through pi is detected.

Then, in S743, it is determined whether or not this number of facilities n is equal to or above the predetermined value N2. When it is equal to or above N2 processing proceeds to S705. When on the other hand it is less than N2 processing proceeds to S744.

In S705 shown in FIG. 8, referring to the map data files of the base map level packets pb through pi surrounding the base map level packet pa in which the present position lies in addition to the map data file of the packet pa, data of facility data file pointers is obtained for all of the facilities of the specified category existing in the region of the packets pa through pi.

When processing initially shifts to S744 from S743, processing proceeds from S744 to S745 on the basis of a determination of S744 which will be further discussed later. In S745, as shown in FIG. 11C, in addition to the base map level packets pa through pi the sixteen base map level packets pj through py surrounding them are selected.

Then, in S742, referring to the respective map data files of the selected twenty five base map level packets pa through py, the number of facilities n of the specified category existing in the region of the selected base map level packets pa through py is detected.

By the processing of S742 through S745 being repeated like this, the number of base map level packets selected is increased with the base map level packet pa in which the present position lies as a center until the number of facilities n is equal to or above the predetermined value N2. Thereby, the scope on the map of the search for facilities of the specified category is widened.

In S744 it is determined whether or not all the base map level packets held in the map data file have been selected, and when they have, because it is not possible for the scope on the map of the search for facilities of the specified category to be widened any further, processing proceeds to S705.

Next, in S705, referring to the map data files of the selected packets, data of facility data file pointers are obtained for all of the facilities of the specified category.

Then, in S706, referring to the facility data file of the respective category, the various data (position on the map, name, address, information and so on) corresponding to the pointers of the facilities of the specified category are read in and this data is stored in the RAM 114a.

Then, all of the facilities of the specified category held in the map data file are rearranged into the order of their proximity to the present position and displayed in this order on the display 113 in the form of a list.

That is, when the scope on the map of the search for facilities is widened to the predetermined value L3 square (S724: YES), if the number of facilities n of the specified category existing in that search scope is less than the predetermined value N3 (S726: NO), the number of facilities of the specified category existing per unit area of the map is extremely small. Consequently, even if the processing of S722 through S725 is repeated and the number of detailed map level packets is increased one round at a time, with respect to the rate at which the number of times the map data file is referred to in S722 increases, the number of facilities found increases very little. To overcome this, the packets are changed from detailed map level packets to base map level packets (S741). Further, the processing of S742 to S745 is repeated to increase the number of base map level packets selected by one round at a time and the necessary number of facilities (the predetermined value N2) can thereby be found in a range as close as possible to the present position without increasing the number of times the map data file is referred to. In other words, by providing the processing of S726, S741 through S743 and S745, it is possible to reduce the number of times the map data file is referred to (the number of times the map data file is accessed) and shorten the total processing time.

The search and display controller 114 then has the user choose a preferred facility by means of the facility specifying keys 112f from among the facilities whose addresses and distances from the present position have been displayed on the display 113 in a list as a result of the processing described above. (By touching the operating keys 112g, the user can instruct to display information relating to an individual facility on the display device 113.)

Then, the search and display controller 114 displays on the display 13 the position of the facility chosen by the user on the map.

Position data showing the position of the specified facility on the map is transferred by the search and display controller 114 to the navigation device 117. The navigation device 117 then selects an optimal route from the present position detected by the position detector 116 to the set destination or object, and referring to the map data file stored in the external storing device 115 displays a map of the vicinity of the present position and the optimal route from the present position to the facility on the display 113.

As described above in detail, in the present preferred embodiment, when the total number of facilities n (search object facilities) of the specified category stored (registered) in the facility data file is equal to or below the predetermined value N1, all of the facilities of the specified category are selected by the search and display controller 114. When the total number of facilities n exceeds the predetermined value N1, facilities of the specified category existing in a predetermined region centering on the vicinity of the present position are selected. The selected facilities are rearranged into the order of their proximity to the present position and displayed on the display 113.

Here, to center the region on the vicinity of the present position, first, with a detailed map level packet in which the present position lies as a center, the scope of the search for facilities of the specified category is increased by one round of surrounding detailed map level packets at a time. And then, with a base map level packet in which the present position lies as a center, the scope of the search for facilities of the specified category is increased by one round of surrounding base map level packets at a time. In this way, the scope of the search for facilities in the vicinity of the present position is thereby gradually widened until a number of facilities equal to or above the predetermined value N2 are selected.

Figure 12:
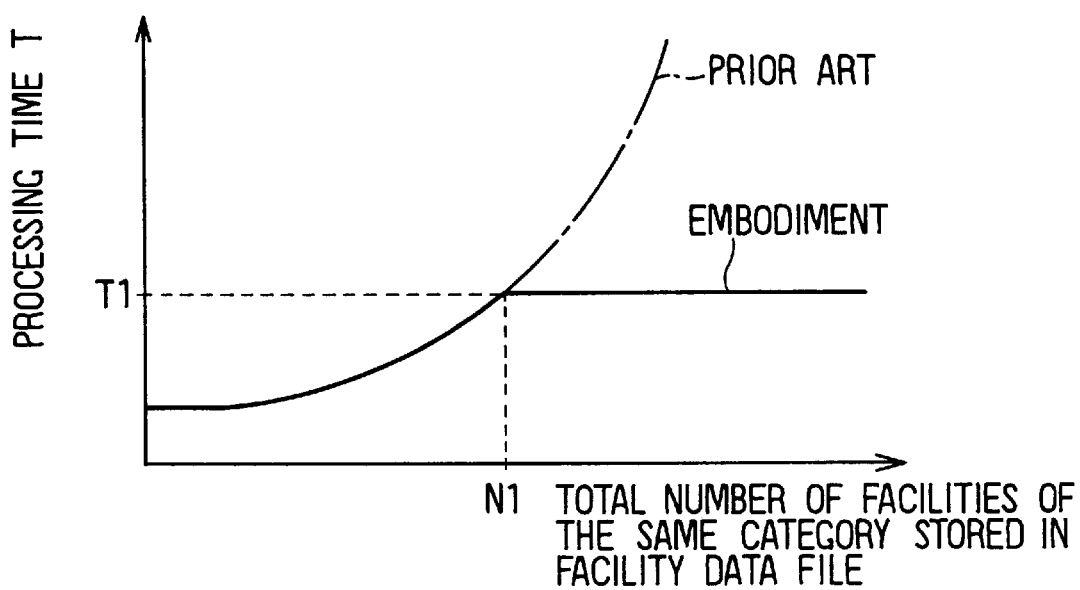
FIG. 12 is a characteristic chart illustrating an action of the second preferred embodiment.

When an ordinary algorithm is used for the processing of rearranging selected facilities into the order of their proximity to the present position, the processing time T required for the rearrangement increases exponentially with respect to the number of facilities n searched. Consequently, as shown in FIG. 12, in this preferred embodiment also, when the total number of facilities n is equal to or below the predetermined value N1, the processing time T increases exponentially with respect to the number of facilities n. However, when the total number of facilities n exceeds the predetermined value N1, the processing time T is kept to a processing time T1 corresponding to the predetermined value N1. In contrast with this, in related art technology, the processing time T increases without limit as the total number of facilities N increases.

Therefore, by setting the predetermined value N1 so that the processing time from when the user specifies a category of facility by operating the keys 112b to 112d to when the rearranged facilities are displayed on the display 113 (including the above-mentioned processing time T1) is kept to within the time that the user can tolerate (normally about two to three seconds), it is possible to prevent the patience of the user from being unnecessarily strained without using a special algorithm for the rearrangement processing.

In the second preferred embodiment described above, searching means is equivalent to the processing of steps S702 through S704, S721 through S726 and S741 through S745 executed by the search and display controller 114, category specifying means is equivalent to the processing of the step S701 executed by the search and display controller 114 and the touch panel 112, distinction specifying means is equivalent to the touch panel 112, position detecting means is equivalent to the position detector 116, rearrangement processing means is equivalent to the processing of S707 and S708 in the search and display controller 114, displaying means, is equivalent to the processing of S709 in the search and display controller 114 and the display 113, recording medium, is equivalent to the built-in ROM and built-in RAM 114a of the search and display controller 114 or the external storing device 115, upper limit, is equivalent to the predetermined value N1, lower limit, is equivalent to the predetermined value N2, and maximum enlargement range, is equivalent to the predetermined value L3.

The invention is not limited to the second preferred embodiment described above and can also be embodied in the following ways to the same effect as in the preferred embodiment described above.

(1) In step S741, in addition to the base map level packet pa in which the present position lies the eight base map level packets pb through pi surrounding this packet pa are selected. However, as long as the condition of the distance L4 of one side of the region covered collectively by the base map level packets selected in S741 being equal to or greater than the predetermined value L3 is satisfied, the number of packets selected in S741 is not particularly limited. For example, if the predetermined value $L_2$ is set to be equal to or above the predetermined value L3 the base map level packet pa alone may be selected in S741. Or, the base map level packets pb through py surrounding the base map level packet pa may be selected in addition to the packet pa in S741.

(2) In the preferred embodiment described above, the size of the packets is changed between two levels: the detailed map level and the base map level. However, packets of an enlarged map level larger than the packets of the base map level may be set and the size of the packets changed between three levels, the detailed map level, the base map level and the enlarged map level. Similarly, the size of the packets may be changed between four levels.

Also, the processing of S726, S741 through S743 and S745 may be dispensed with and the packets kept at the detailed map level and not changed to a base map level.

(3) Although the predetermined values N2, N3 and L3 may be made fixed values, they may alternatively be made freely settable by the user using the touch panel 112.

(4) In the second preferred embodiment described above, the user only specifies a category of facility. However, in addition to a category of facility, provision may be made for the user to specify a distinction based on facility characteristics using the touch panel 112. For example, when Gas Station has been specified as the category, the user may be allowed to specify the name of a petroleum company as a distinction based on facility characteristics. Similarly, when Bank has been specified as the category, the user may be allowed to specify the name of a bank as a distinction based on facility characteristics. And when Restaurant has been specified as the category, the user may be allowed to specify a type of restaurant (for example Japanese, Chinese, French) as a distinction based on facility characteristics.

(5) In the second preferred embodiment described above, only one category of facility to be searched for is specified. However, provision may be made for the user to specify a plurality of categories of facility, and for example specify any two categories of facility like Gas Station and Bank and search for them at the same time.

(6) The determination condition of S744 may alternatively be made that of whether or not one side of the map search scope is equal to or above L4 (L4>L3) to avoid the search scope being excessively enlarged.

(7) In the second preferred embodiment described above, facilities are searched in a range close to the present position. However, provision may be made for facilities to be searched in a range close to any specified position and not just the present position, and in this case the invention can be applied not only to a car navigation system but also for example to an office appliance or an electronic map book.

(8) The shape of the packets is not limited to square and may be made another shape with which it is possible to divide up a map (for example rectangular, triangular, or hexagonal), or shapes dividing the map into administrative district units.

(9) The search and display controller 114 and the navigation device 117 can be realized with the same device using multitask processing.

What is claimed is:

1. A map displaying apparatus comprising:

a displaying device for displaying a map;

a map storing device for storing multiple maps showing predetermined areas with different scales;

a facility storing device for storing data of facilities located in respective positions on the maps:

a facility category selecting device for selecting a category of facility to be displayed on the displaying device;

a display controlling device for displaying one of the maps having different scales stored in the map storing device on the displaying device and displaying facilities selected by the facility category selecting device in the respective positions on the displayed map; and a map scale controlling device for changing scale of the map displayed on the displaying device by the display controlling device so that a number of facilities displayed on the map by the display controlling device is kept equal to or lower than a predetermined upper limit, wherein the map scale controlling device first changes the scale of the map displayed on the displaying device to a largest scale and then reduces the scale of the map one level at a time until the number of facilities displayed on the map is equal to or more than a predetermined lower limit, and when the number of facilities displayed on the map is equal to or more than the lower limit, the map scale controlling device determines whether or not the number of facilities is equal to or lower than the upper limit when the scale of the map is reduced further by one level, and then only when the number of facilities is equal to or lower than the upper limit, the map scale controlling device further reduces the scale of the map by one level.

2. A map displaying apparatus according to claim 1, wherein the map scale controlling device displays on the displaying device a message to the effect that no facility can be displayed when not a single facility is displayed on the map even when the scale of the map is reduced to a smallest scale at which the facility can be displayed.

3. A map displaying apparatus according to claim 1, further comprising:

a present position detecting device for detecting a present position, wherein the display controlling device displays a map of a vicinity of the present position detected by the present position detecting device with the present position at its center.

4. A map displaying apparatus comprising:

a displaying device for displaying a map;

a map storing device for storing multiple maps showing predetermined areas with different scales;

a facility storing device for storing data of facilities located in respective positions on the maps;

a facility category selecting device for selecting a category of facility to be displayed on the displaying device;

a display controlling device for displaying one of the maps having different scales stored in the map storing device on the displaying device and displaying facilities selected by the facility category selecting device in the respective positions on the displayed map; and a map scale controlling device for changing scale of the map displayed on the displaying device by the display controlling device so that a number of facilities displayed on the map by the display controlling device is kept equal to or lower than a predetermined upper limit, wherein the map scale controlling device first determines whether or not the number of facilities displayed on the map is within a predetermined range defined by the predetermined upper limit and a predetermined lower limit, and when the number of facilities is lower than the lower limit, the map scale controlling device reduces the scale of the map one level at a time until the number of facilities displayed on the map is equal to or more than the lower limit, and when the number of facilities is equal to or more than the lower limit, the map scale controlling device determines whether or not the number of facilities is equal to or lower than the upper limit when the scale of the map is further reduced by one level, only when the number of facilities is equal to or lower than the upper limit, the map scale controlling device further reduces the scale of the map by one level, when on the other hand the number of facilities initially exceeds the upper limit, the map scale controlling device increase the scale of the map until the number of facilities displayed on the map is equal to or lower than the upper limit.

5. A map displaying apparatus comprising:

a displaying device for displaying a map;

a map storing device for storing multiple maps showing predetermined areas with different scales;

a facility storing device for storing data of facilities located in respective positions on the maps;

a facility category selecting device for selecting a category of facility to be displayed on the displaying device;

a display controlling device for displaying one of the maps having different scales stored in the map storing device on the displaying device and displaying facilities selected by the facility category selecting device in the respective positions on the displayed map;

a map scale controlling device for changing scale of the map displayed on the displaying device by the display controlling device so that a number of facilities displayed on the map by the display controlling device is kept equal to or lower than a predetermined upper limit; and a scale selecting device for manually selecting the scale of the map to be displayed on the displaying device, wherein, after the map scale controlling device has so changed the scale of the map that the number of facilities displayed is kept equal to or lower than the upper limit, when the scale of the map is selected by the scale selecting device, the map scale controlling device finds the map of the scale selected by the scale selecting device from the map storing device and change the map displayed on the displaying device to the map of the scale selected.

6. A searching system for searching facilities in the vicinity of a given location on a map, the searching system comprising:

a map storing device for storing map data of a predetermined area;

a facility storing device for storing data of facilities located in the predetermined area;

a facility category selecting device for selecting a category of facility;

a determining device for determining whether a number of facilities of the selected category exceeds a predetermined upper limit;

a searching device which only searches the facilities of the selected category located in a predetermined region centering on the vicinity of the given location, when the number of facilities exceeds the predetermined upper limit;

wherein, when the number of facilities of the selected category located in the predetermined region is less than a predetermined lower limit, the searching device enlarges the predetermined region until the number of facilities of the selected category is equal to or more than the lower limit, thereby searching the facilities located in the enlarged region, and wherein the searching device stops enlargement of the predetermined region when the number of facilities of the selected category is less than the lower limit even after the predetermined region has been enlarged to a maximum range, thereby searching the facilities located in the predetermined region enlarged to the maximum range.

7. A searching system according to claim 6, wherein the searching device searches all facilities of the selected category when the number of facilities is no greater than the upper limit.

8. A searching system according to claim 6, wherein the facility category selecting device is capable of selecting a plurality of categories of facility at a time, and the searching device searches the facilities of all categories selected by the facility category selecting device.

9. A searching system according to claim 8, further comprising:

a distinction specifying device for specifying a distinction based on characteristics of facilities, wherein the searching device searches facilities of the specified distinction among the facilities of the selected category.

10. A searching system according to claim 6, further comprising:

a position detecting device for detecting a present position of an object installed with the searching system;

wherein the searching device searches the facilities using the present position detected by the position detecting device as the given location.

11. A searching system according to claim 6, wherein the searching device is realized by means of a computer-readable recording medium recorded with a computer program.

12. A searching system for searching facilities in the vicinity of a given location on a map, the searching system comprising:

a map storing device for storing map data of a predetermined area;

a facility storing device for storing data of facilities located in the predetermined area;

a facility category selecting device for selecting a category of facility;

a determining device for determining whether a number of facilities of the selected category exceeds a predetermined upper limit;

a searching device which only searches the facilities of the selected category located in a predetermined region centering on the vicinity of the given location, when the number of facilities exceeds the predetermined upper limit;

wherein, when the number of facilities of the selected category located in the predetermined region is less than a predetermined lower limit, the searching device enlarges the predetermined region until the number of facilities of the selected category is equal to or more than the lower limit, thereby searching the facilities located in the enlarged region, and wherein the searching device increase a rate of enlargement of the predetermined region, when the number of facilities is less than the lower limit even after the predetermined region has been enlarged to a first maximum range, and enlarges the predetermined region toward a second maximum range at the increased rate until the number of facilities of the selected category is equal to or more than the lower limit, thereby searching the facilities located in the enlarged region.

13. A searching system for searching facilities in the vicinity of a given location on a map, the searching system comprising:

a map storing device for storing map data of a predetermined area;

a facility storing device for storing data of facilities located in the predetermined area;

a facility category selecting device for selecting a category of facility;

a determining device for determining whether a number of facilities of the selected category exceeds a predetermined upper limit;

a searching device which only searches the facilities of the selected category located in a predetermined region centering on the vicinity of the given location, when the number of facilities exceeds the predetermined upper limit;

a rearrangement processing device for rearranging the facilities searched by the searching device in the order of proximity to the given location; and a displaying device for displaying the facilities which have been rearranged in a form of a list, wherein the upper limit is set in correspondence with a total time made up of a time required for a search processing carried out by the searching device and a time required for a rearrangement processing carried out by the rearrangement processing device.

* * * * *